US011978343B2

(12) United States Patent
Nakagawa

(10) Patent No.: US 11,978,343 B2
(45) Date of Patent: May 7, 2024

(54) INFORMATION PROCESSING APPARATUS AND INFORMATION PROCESSING SYSTEM

(71) Applicant: TOYOTA JIDOSHA KABUSHIKI KAISHA, Toyota (JP)

(72) Inventor: Yuki Nakagawa, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 336 days.

(21) Appl. No.: 17/314,156

(22) Filed: May 7, 2021

(65) Prior Publication Data

US 2021/0358303 A1 Nov. 18, 2021

(30) Foreign Application Priority Data

May 15, 2020 (JP) ................................ 2020-085846

(51) Int. Cl.
*G08G 1/16* (2006.01)
*G07C 5/00* (2006.01)
*G07C 5/08* (2006.01)

(52) U.S. Cl.
CPC ............. *G08G 1/161* (2013.01); *G07C 5/008* (2013.01); *G07C 5/0816* (2013.01)

(58) Field of Classification Search
None
See application file for complete search history.

(56) References Cited

U.S. PATENT DOCUMENTS 9,810,783 B2 * 11/2017 Fligler ................... G08G 1/054
10,176,524 B1 * 1/2019 Brandmaier ......... G08G 1/0112
10,759,442 B2 * 9/2020 Stenneth ................ G07C 5/008
2010/0324775 A1 * 12/2010 Kermani .......... G08G 1/096775 701/1
2012/0290166 A1 * 11/2012 Wallace ................. G07C 5/085 701/29.2
2015/0310742 A1 * 10/2015 Albornoz ......... G08G 1/096716 340/905
2015/0344038 A1 * 12/2015 Stenneth ................ G07C 5/008 340/439
2016/0150070 A1 * 5/2016 Goren ............... H04M 1/72421 455/418
2017/0018186 A1 * 1/2017 Probert .................. G08G 1/166
2017/0162051 A1 * 6/2017 Satoh ................... G05D 1/0011
2017/0197549 A1 * 7/2017 Vladimerou .......... B60W 30/08
2017/0365166 A1 12/2017 Lu et al.
(Continued)

FOREIGN PATENT DOCUMENTS

CN 110379190 A 10/2019
JP H05-266399 A 10/1993
(Continued)

*Primary Examiner* — Muhammad Adnan
(74) *Attorney, Agent, or Firm* — Oliff PLC

(57) ABSTRACT

An information processing apparatus disclosed is provided on a vehicle. The information processing apparatus has a controller configured to execute the processing of obtaining a trajectory record defined as a record of the trajectory along which the vehicle has travelled, detecting an abnormal behavior of the vehicle, generating record information, which is information representing a trajectory record prior to the detection of the abnormal behavior of the vehicle among the obtained trajectory records, and transmitting the record information to other vehicles.

3 Claims, 7 Drawing Sheets

(56) References Cited

U.S. PATENT DOCUMENTS

| | | | | |
|---|---|---|---|---|
| 2017/0369055 | A1* | 12/2017 | Saigusa | G08G 1/096775 |
| 2019/0371085 | A1* | 12/2019 | Kishikawa | G08G 1/0112 |
| 2020/0108869 | A1* | 4/2020 | You | G08G 1/161 |
| 2022/0324438 | A1* | 10/2022 | Liu | B60W 50/14 |

FOREIGN PATENT DOCUMENTS

| | | | |
|---|---|---|---|
| JP | 2009-289220 | A | 12/2009 |
| JP | 2011-238045 | A | 11/2011 |
| JP | 2012-128734 | A | 7/2012 |
| JP | 2013-109746 | A | 6/2013 |
| JP | 2017-130198 | A | 7/2017 |
| JP | 2017-228286 | A | 12/2017 |
| JP | 2018-028855 | A | 2/2018 |

* cited by examiner

[Fig. 1]
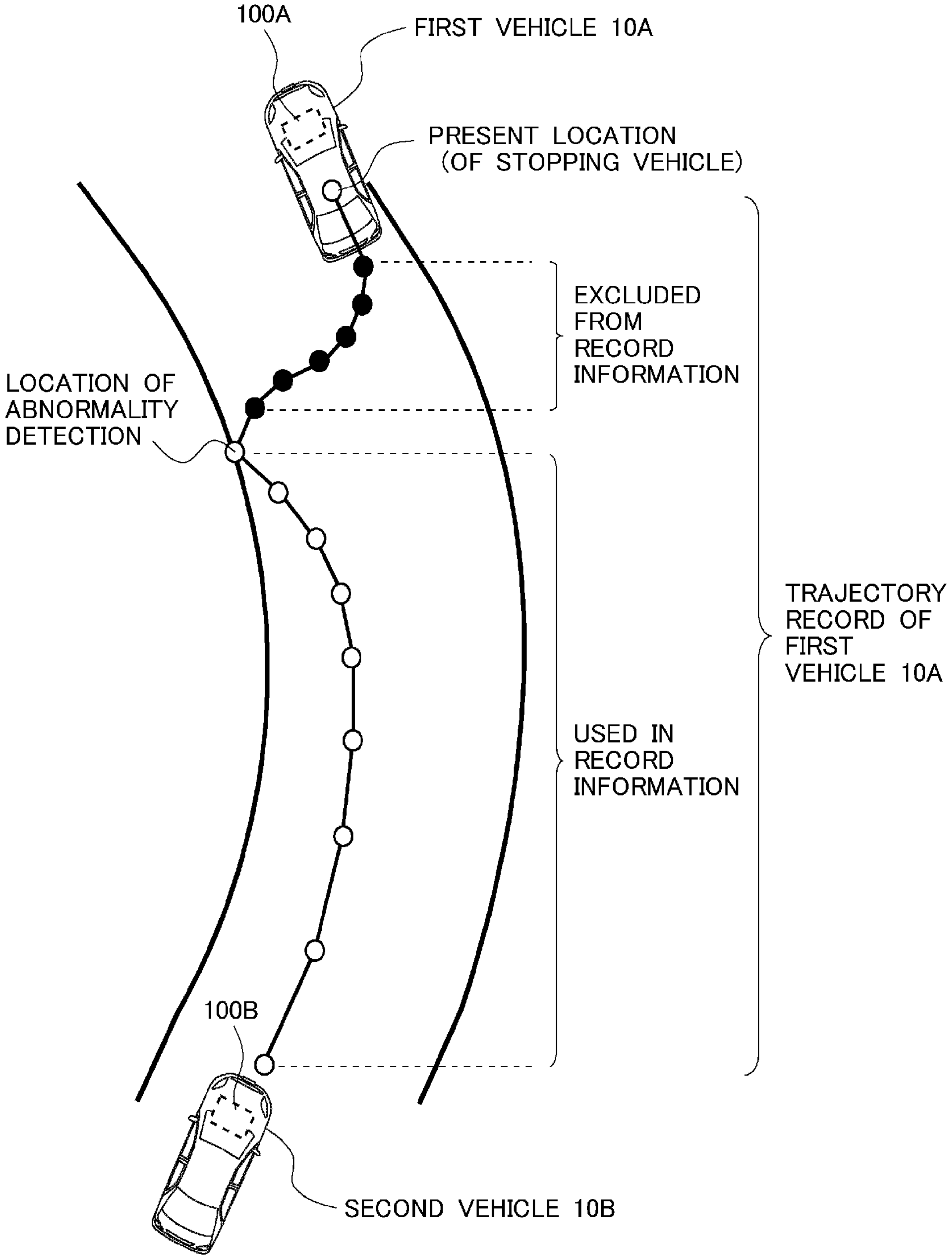

[Fig. 2]
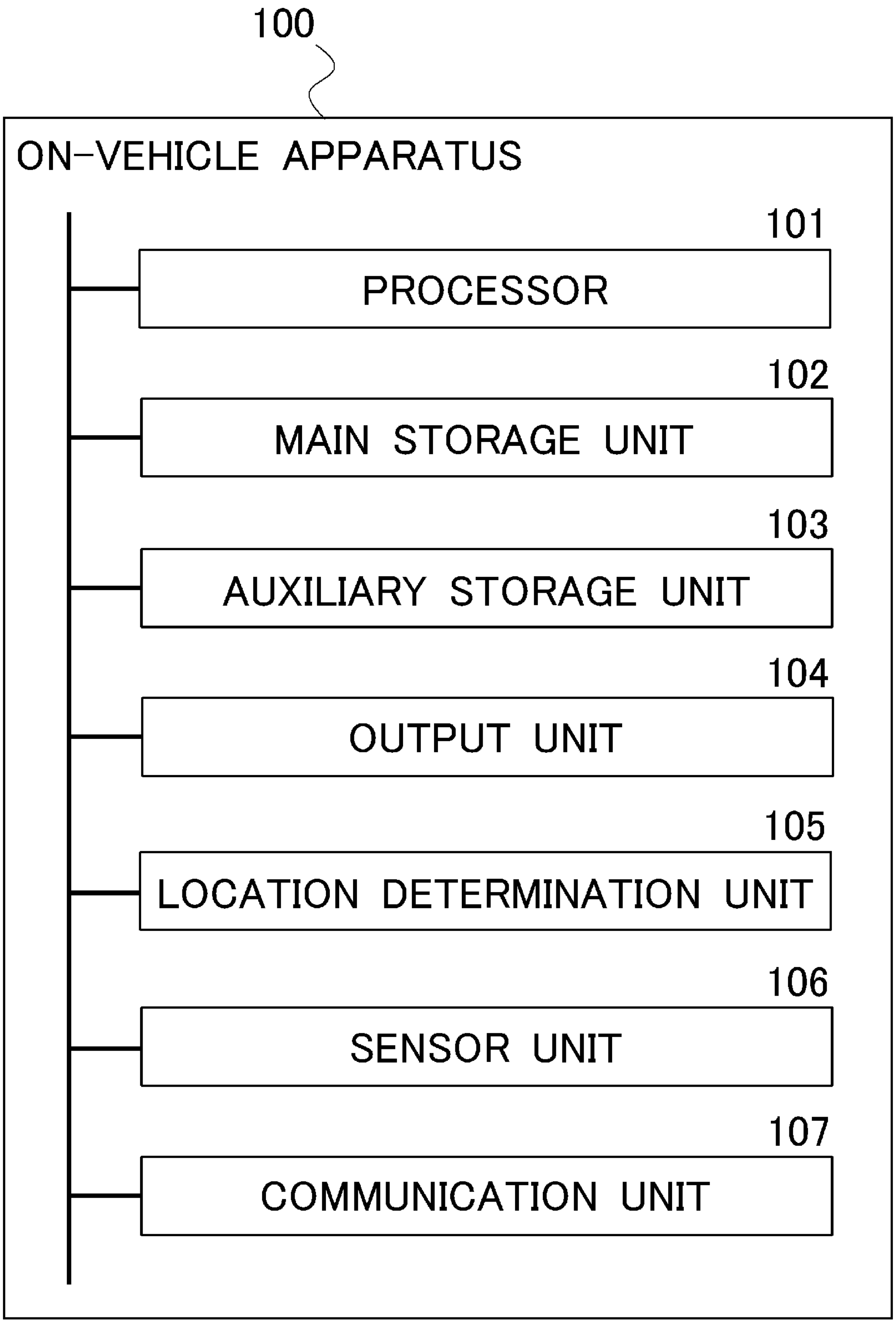

[Fig. 3]
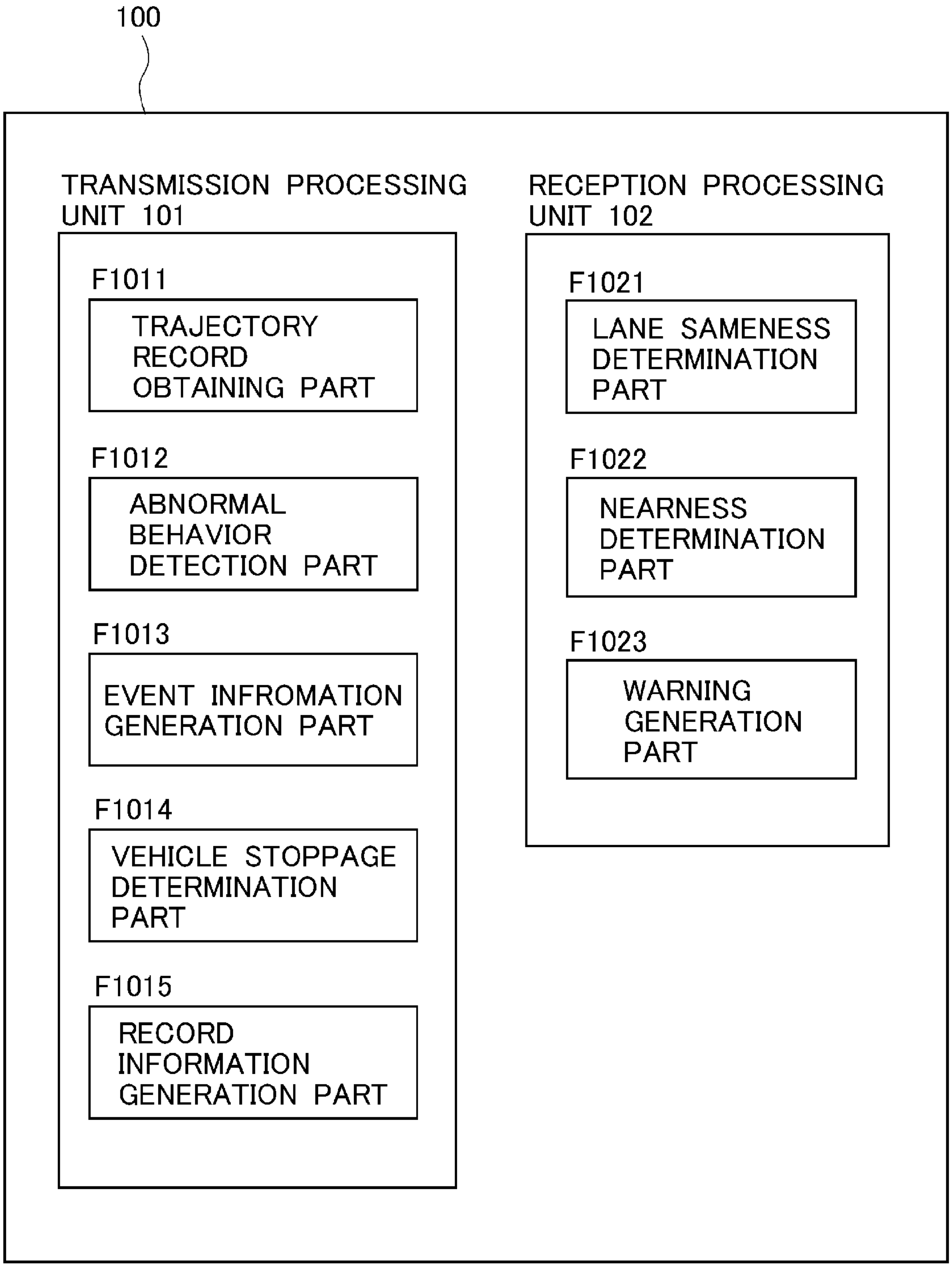

[Fig. 4]
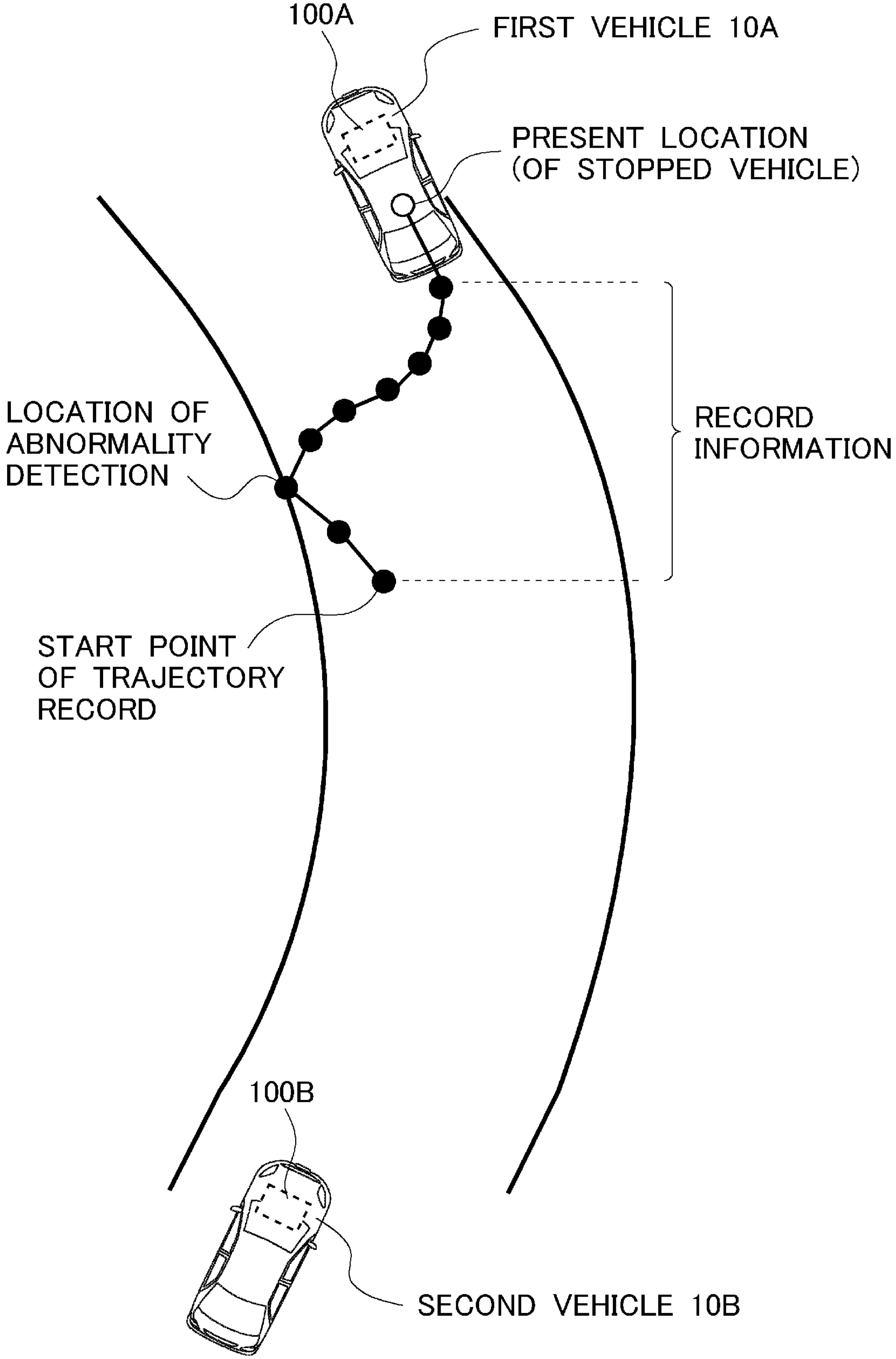

[Fig. 5]
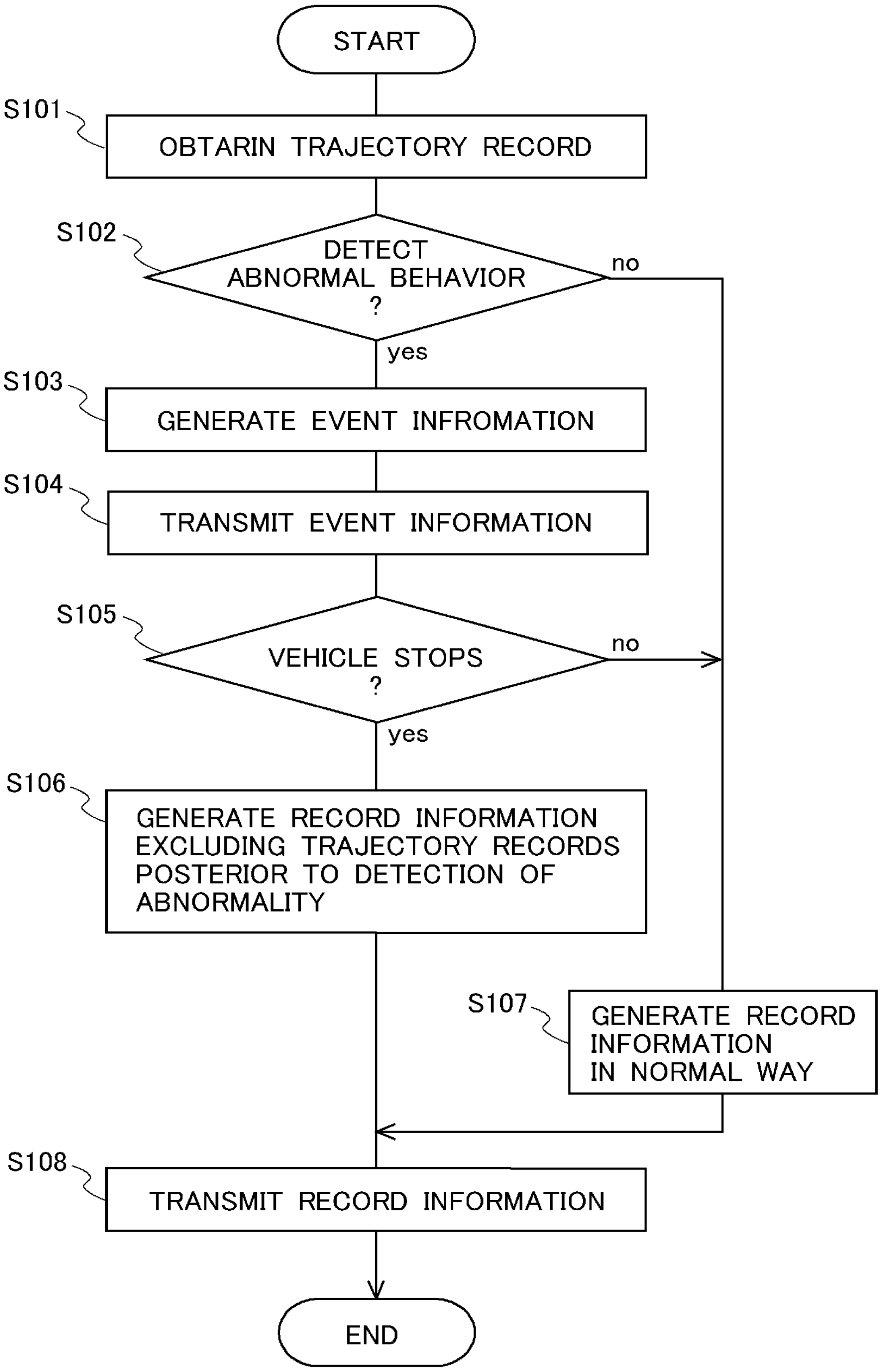

[Fig. 6]
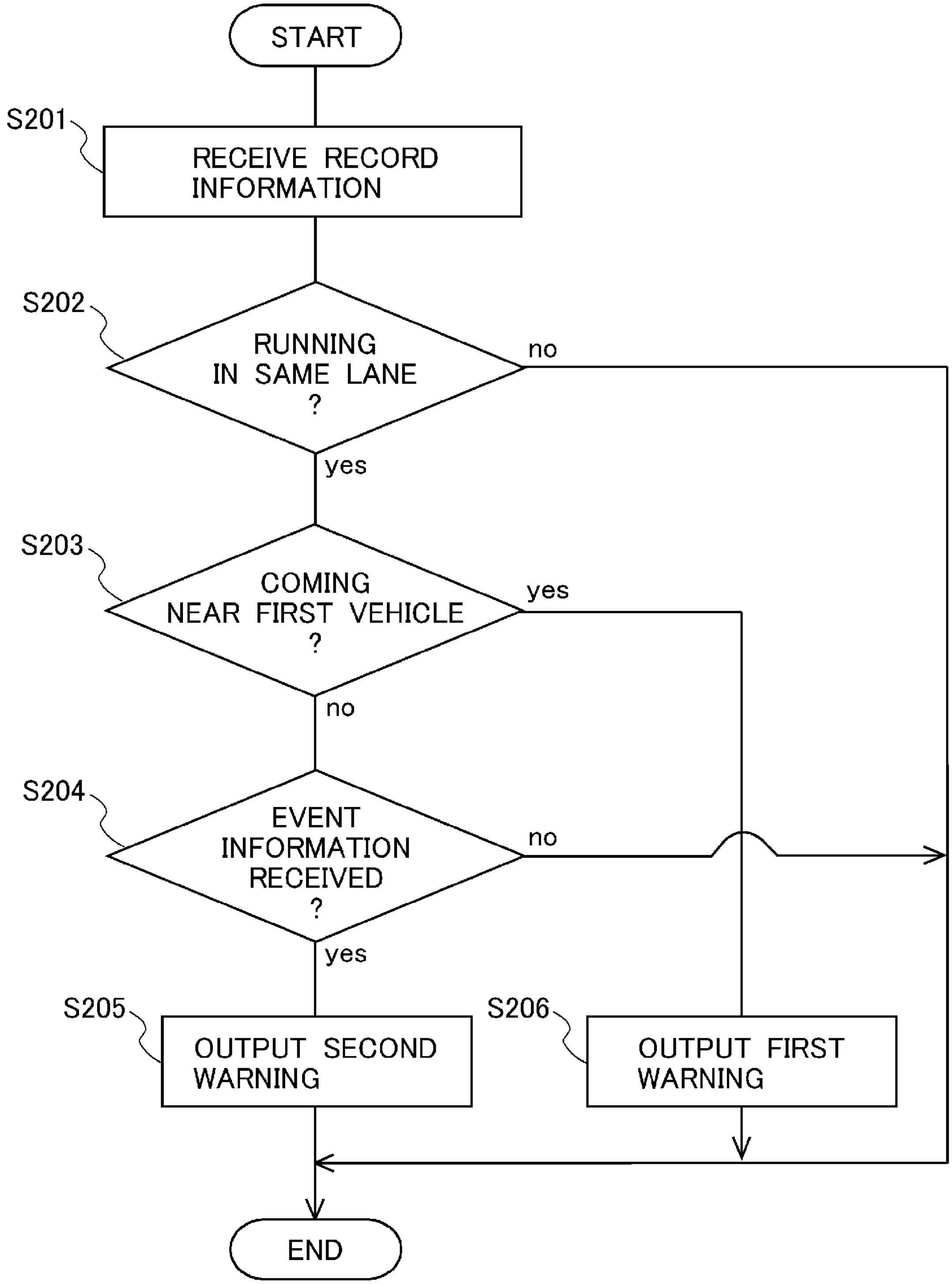

[Fig. 7]
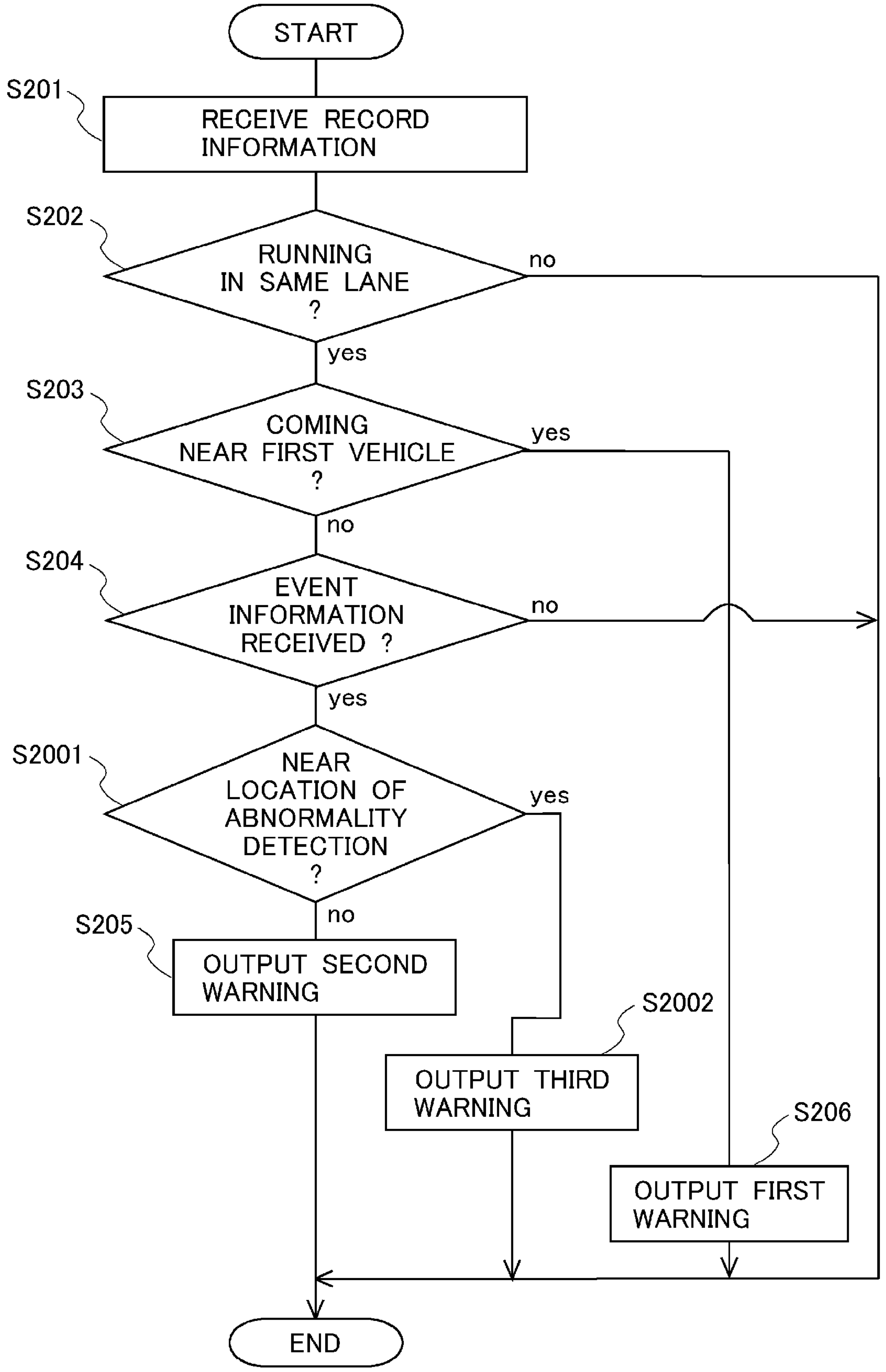

INFORMATION PROCESSING APPARATUS AND INFORMATION PROCESSING SYSTEM

CROSS-REFERENCE TO RELATED APPLICATIONS

This application claims the benefit of Japanese Patent Application No. 2020-085846, filed on May 15, 2020 which is hereby incorporated by reference herein in its entirety.

BACKGROUND

Technical Field

This disclosure relates to an information processing apparatus and an information processing system.

Description of the Related Art

Communications technologies for vehicles, such as V2X (Vehicle-to-Everything) have been developed in recent years. This also involves development of vehicles equipped with apparatuses capable of communicating with external apparatuses. Such a vehicle according to a prior art is configured to obtain a record of the trajectory of travel of another (or second) vehicle running ahead by vehicle-to-vehicle (V2V) communication with it and determine whether the vehicle is running on the same lane as the vehicle ahead. If there is a possibility that the vehicle and the vehicle ahead will collide with each other, warning is given to the driver of the vehicle. (See, for example, Patent Literature 1 in the citation list below.)

CITATION LIST

Patent Literature

Patent Literature 1: Japanese Patent Application Laid-Open No. 2017-130198

SUMMARY

An object of this disclosure is to provide a technology pertaining to vehicle-to-vehicle communication to enable transmission and reception of more useful information.

Disclosed herein is an information processing apparatus provided on a vehicle. An information processing apparatus according to a first mode is provided on a vehicle and may comprise a controller including at least one processor, the controller configured to execute the processing of:

obtaining a trajectory record defined as a record of the trajectory along which the vehicle has travelled;

detecting an abnormal behavior of the vehicle;

generating record information, which is information representing a trajectory record prior to the detection of the abnormal behavior of the vehicle among the obtained trajectory records; and transmitting the record information to other vehicles.

An information processing apparatus according to a second mode is provided in a vehicle and may comprise a controller including at least one processor, the controller configured to execute the processing of:

receiving from another vehicle record information defined as information representing a record of the trajectory along which the other vehicle has travelled before an abnormal behavior of the other vehicle is detected and information for specifying the location of abnormality detection defined as the location at which the abnormal behavior of the other vehicle is detected; and informing an occupant of the vehicle that the vehicle comes near the location of abnormality detection, when the vehicle enters a first range from the location of abnormality detection.

Also disclosed herein is an image processing system. The information processing system may comprise a first information processing apparatus and a second information processing apparatus. The first information processing apparatus may be provided on, for example, a first vehicle and configured to transmit record information defined as information representing a record of the trajectory along which the first vehicle has travelled to other vehicles. The second information processing apparatus may be provided on, for example, a second vehicle and configured to forecast whether there is a possibility that the second vehicle will collide with the first vehicle on the basis of the record information received from the first information processing apparatus. If it is forecast that there is a possibility that the second vehicle will collide with the first vehicle, the second information processing apparatus may give a warning to an occupant of the second vehicle. In this information processing system, when an abnormal behavior of the first vehicle is detected, the first information processing apparatus may transmit information representing a record of the trajectory along which the first vehicle had travelled before the detection of the abnormal behavior of the first vehicle to the second vehicle as the record information.

Also disclosed herein is an information processing method comprising at least a portion of the above-described processing. Also disclosed herein is an information processing program for implementing such a method and a non-transitory storage medium in which such an information program is stored.

This disclosure can provide a technology pertaining to vehicle-to-vehicle communication to enable transmission and reception of more useful information.

BRIEF DESCRIPTION OF DRAWINGS

FIG. 1 is a diagram illustrating the general configuration of a drive assistance system.

FIG. 2 is a diagram illustrating an exemplary hardware configuration of an on-vehicle apparatus.

FIG. 3 is a block diagram illustrating the functional configuration of the on-vehicle apparatus.

FIG. 4 is a diagram illustrating record information generated in a normal way.

FIG. 5 is a flow chart of a process executed by an on-vehicle apparatus to transmit record information to other vehicles in an embodiment.

FIG. 6 is a flow chart of a process executed by an on-vehicle apparatus after receiving record information from another vehicle according to the embodiment.

FIG. 7 is a flow chart of a process executed by an on-vehicle apparatus after receiving record information from another vehicle according to a second modification.

DESCRIPTION OF EMBODIMENTS

An information processing apparatus disclosed herein is provided on a vehicle designed to travel on roads. The information processing apparatus has a controller. The controller obtains a record of the trajectory along which the vehicle provided with the information processing apparatus (which will also be referred to as "the first vehicle" hereinafter) has travelled. This record will be hereinafter referred to as "trajectory record". The controller generates information representing the trajectory record obtained as above and transmit it to other vehicles. This information will be hereinafter referred to as "record information". In a vehicle behind the first vehicle (which will be referred to as "the second vehicle") among the other vehicles that receive the record information, it is determined whether the second vehicle is running in the same lane as the first vehicle on the basis of the record information. For example, if the distance between the trajectory along which the first vehicle has travelled and the trajectory along with the second vehicle is travelling is smaller than a specific distance, it is determined that the second vehicle is running in the same lane as the first vehicle. In the case where it is determined that the second vehicle is running in the same lane as the first vehicle, when the second vehicle comes near the first vehicle, warning is given to an occupant (e.g. a driver) of the second vehicle. This enables the occupant of the second vehicle to drive it so as to prevent a collision of the first vehicle and the second vehicle.

The record information represents the trajectory record by a set of corner points (or bending points) of a polygonal line that approximates the trajectory record. The amount of data of the record information increases with increasing number of corner points of the polygonal line that approximates the trajectory record. This polygonal line will also be referred to as "approximation trajectory" hereinafter). For example, the number of corner points of the approximation trajectory for a trajectory record containing curves is larger than that for a trajectory record containing no curves, leading to a larger amount of data of the record information. The amount of data transmitted between vehicles is limited by an upper limit in some cases. More specifically, an upper limit is set for the number of corner points contained in record information in some cases. If this is the case, the length of the trajectory (or the length along the direction of travel on the road) that can be communicated by record information is shorter in the case where the trajectory record contains curves than in the case where the trajectory record contains no curves. In particular, in cases where the first vehicle behaves abnormally, for example, changes its direction of travel abruptly or runs erratically, the length of the trajectory that can be communicated by record information may be unduly short. Record information communicated between vehicles is generally generated using the latest trajectory record whose end point is the present location of the first vehicle. Therefore, there may be cases where there is a relatively large distance between the start point of the trajectory represented by record information transmitted from the first vehicle after its abnormal behavior and the present location of the second vehicle. In consequence, it may be difficult for the second vehicle that has received the record information to accurately determine whether the second vehicle is running in the same lane as the first vehicle.

As a countermeasure to the above problem, the controller of the control information processing apparatus disclosed herein is configured to detect an abnormal behavior of the first vehicle. Examples of the abnormal behavior include abrupt steering with a steering speed larger than a specific speed, abrupt deceleration with a magnitude larger than a specific magnitude, slippage of wheels, and operation of an airbag. Such abnormal behaviors can be detected using known technologies. When an abnormal behavior of the first vehicle is detected, the controller generates information representing a trajectory record prior to (or older than) the detection of the abnormal behavior among the trajectory records of the first vehicle as record information. This record information is transmitted from the first vehicle to other vehicles. In the case where the amount of data of the record information is limited below a specific data amount, the controller may generate information that represents the latest trajectory record among the trajectory records prior to the detection of the abnormal behavior of the first vehicle while having a data amount not exceeding the specific data amount as record information. This can reduce the distance between the start point of the trajectory represented by record information transmitted from the first vehicle after its abnormal behavior and the present location of the second vehicle. In other words, the usefulness of the record information transmitted from the first vehicle to the second vehicle is increased. This improves the accuracy of the determination made by the second vehicle as to whether the second vehicle is running in the same lane as the first vehicle.

The controller of the information processing apparatus disclosed herein may transmit information specifying the location at which an abnormal behavior of the first vehicle is detected to other vehicles with the aforementioned record information. The location at which the abnormal behavior of the first vehicle is detected will be hereinafter referred to as the "location of abnormality detection". When the second vehicle comes near the location of abnormality detection after receiving these two kinds of information, the second vehicle can inform its occupant of that fact. Moreover, the second vehicle can be aware of the possibility that the trajectory may discontinue after the location of abnormality detection.

The controller of the information processing apparatus disclosed herein may transmit information in which the location of abnormality detection of the first vehicle and details of the abnormal behavior are linked with each other to other vehicles. This information will be hereinafter referred to as "event information". When the second vehicle comes near the location of abnormality detection of the first vehicle after receiving these two kinds of information, the second vehicle can inform its occupant of the details of the abnormal behavior. Consequently, the occupant of the second vehicle can perform driving operations based on details of the abnormal behavior, such as operations for slowing down the speed of the second vehicle or temporarily stopping the second vehicle. The event information may be transmitted separately from the aforementioned record information. This can prevent the length of the trajectory represented by the record information from becoming unduly short.

If the first vehicle stops running within a specific length of time after the detection of the abnormal behavior of the first vehicle, the controller may transmit information about the location at which the first vehicle is stopped to other vehicles with the aforementioned record information. When the second vehicle comes near the location at which the first vehicle is stopped after receiving this information, the second vehicle may inform its occupant that the second vehicle comes near the location at which the first vehicle is stopped. This can prompt the occupant of the second vehicle to perform driving operations for avoiding a collision of the second vehicle with the stopped first vehicle. The information about the location at which the first vehicle is stopped may be transmitted to other vehicles separately from the aforementioned record information. For example, the information about the location at which the first vehicle is stopped may be transmitted to other vehicles with the aforementioned event information.

The process of transmitting record information based on a trajectory record prior to the detection of abnormal behavior from the first vehicle to other vehicles may be executed only in cases where the first vehicle stops running within a specific length of time after the detection of the abnormal behavior of the first vehicle. In other words, in cases where the first vehicle can continue to run after its abnormal behavior, a normal process, e.g. the processing of transmitting record information based on the latest trajectory record whose end point is the present location of the first vehicle to other vehicles, may be executed.

Transmission of the various data from the first vehicle to other vehicles may be performed using short distance communications (e.g. communications with a range of tens to hundreds meters). This can prevent vehicles running in places remote from the first vehicle from receiving unnecessary data. This short distance communications may be data communications based on a certain communication standard, such as Bluetooth Low Energy (BLE), NFC (Near Field Communication), UWB (Ultra Wideband), or WI-Fi (registered trademark).

In the following, a specific embodiment of the technology disclosed herein will be described with reference to the drawings. It should be understood that dimensions, materials, shapes, relative arrangements, and other features of the components that will be described in connection with the embodiment are not intended to limit the technical scope of the disclosure only to them, unless otherwise stated.

Embodiment

In the following, a system for providing vehicle driver assistance (which will be also referred to as "driver assistance system" hereinafter) to which the technology disclosed herein is applied will be described as an illustrative embodiment. The vehicles to which the driver assistance system is directed are vehicles travelling on roads.

Outline of Driver Assistance System

FIG. 1 is a diagram illustrating the outline of the driver assistance system. The driver assistance system of this embodiment includes a first on-vehicle apparatus 100A provided on a first vehicle 10A and a second on-vehicle apparatus 100B provided on a second vehicle 10B. The first vehicle 10A and the second vehicle 10B are running in the same lane, and the first vehicle 10A is running ahead of the second vehicle 10B. The first on-vehicle apparatus 100A and the second on-vehicle apparatus 100B perform vehicle-to-vehicle communication (V2V) using, for example, mobile communications, narrow-band communications, wireless communications, or short distance communications. While FIG. 1 shows only two on-vehicle apparatuses (i.e. the first on-vehicle apparatus 100A and the second on-vehicle apparatus 100B), the system may be applied to more than two on-vehicle apparatuses.

The first on-vehicle apparatus 100A constitutes the first information processing apparatus defined in the technology disclosed herein. The first on-vehicle apparatus 100A obtains a record of the trajectory along which the first vehicle 10A has travelled (i.e. a trajectory record), and transmits information representing the trajectory record obtained (i.e. record information) to other vehicles by V2V. The record information is information representing the trajectory record by a set of corner points (or bending point) of a polygonal line that approximates the trajectory record (i.e. approximation trajectory). The number of corner points that may be contained in the record information is limited below a predetermined upper limit. Therefore, the record information is generated on the basis of the latest trajectory record whose end point is the present location of the first vehicle 10A among the trajectory records of the first vehicle 10A. However, in cases where an abnormal behavior of the first vehicle 10A is detected and the first vehicle 10A stops running soon after the detection, the record information is generated on the basis of the latest trajectory record whose end point is the location at which the abnormality is detected (or the location of abnormality detection) among the trajectory records of the first vehicle 10A prior to the detection of the abnormal behavior. The corner points specified by this recorded information may include the present location of the first vehicle 10A (i.e. the location at which the first vehicle 10A is stopped). In this case, the record information may be generated in such a way that the number of corner points including the location at which the first vehicle 10A is stopped (which is also counted as a corner point) does not exceed the upper limit. The abnormal behavior mentioned above refers to a behavior that can make the number of corner points of the approximation trajectory unduly large. Examples of the abnormal behavior include abrupt steering, abrupt deceleration, skid, and operation of an airbag. The first on-vehicle apparatus 100A performs the process of obtaining a trajectory record and the process of transmitting record information repeatedly while the first vehicle 10A is running.

The second on-vehicle apparatus 100B constitutes the second information processing apparatus defined in the technology disclosed herein. The second on-vehicle apparatus 100B receives record information from the first vehicle 10A and provides driving assistance based on the received record information. An example of the driving assistance is the processing of assisting driving for avoiding a collision of the second vehicle 10B with another vehicle. In the process of driving assistance, the second on-vehicle apparatus 10B firstly executes the processing of determining whether the second vehicle 10B is running in the same lane as the first vehicle 10A. If, for example, the distance between the trajectory along which the first vehicle 10A has travelled and the trajectory along which the second vehicle 10B is travelling is smaller than a specific distance, the second on-vehicle apparatus 10B determines that the second vehicle 10B is running in the same lane as the first vehicle 10A. The aforementioned specific distance is a distance that allows the determination that the second vehicle 10B is running in the same lane as the first vehicle 10A. For example, the specific distance may be set a short distance close to zero. The method of determining whether the second vehicle 10B is running in the same lane as the first vehicle 10A is not limited to the above method, but other known methods may be employed. In the case where it is determined that the second vehicle 10B is running in the same lane as the first vehicle 10A, when the second vehicle 10B comes near the first vehicle 10A, the second on-vehicle apparatus 10B executes the processing of giving a warning to an occupant (e.g. a driver) of the second vehicle 10B. The time to give such a warning may be the time when the distance between the second vehicle 10B and the first vehicle 10A becomes smaller than a specific threshold or the time when the time expected to be taken for the second vehicle 10B to reach the location at which the first vehicle 10A is located becomes smaller than a specific threshold. This timing is determined using known technologies.

Hardware Configuration of On-Vehicle Apparatus

FIG. 2 is a diagram illustrating the hardware configuration of the on-vehicle apparatus. The first on-vehicle apparatus 100A and the second on-vehicle apparatus 100B have the same hardware configuration. Hence, in the following description, the first on-vehicle apparatus 100A and the second on-vehicle apparatus 100B will be collectively referred to as the on-vehicle apparatus 100. The first vehicle 10A and the second vehicle 10B will be collectively referred to as the vehicle 10 accordingly.

As illustrated in FIG. 2, the on-vehicle apparatus 100 has a processor 101, a main storage unit 102, an auxiliary storage unit 103, an output unit 104, a location determination unit 105, a sensor unit 106, and a communication unit 107. The on-vehicle apparatus 100 implements functions for achieving desired purposes by loading programs stored in a recording medium into a workspace of the main storage unit 102 and executing them by the processor 101 to perform various controls.

The processor 101 is, for example, a CPU (Central Processing Unit) or a DSP (Digital Signal Processor). The processor 101 controls the on-vehicle apparatus 100 and executes computation of various information processing.

The main storage unit 102 includes, for example, a RAM (Random Access Memory) and/or a ROM (Read Only Memory). A workspace for executing programs by the processor is formed in the main storage unit 102, as described above.

The auxiliary storage unit 103 includes, for example, an EPROM (Erasable Programmable ROM) or a hard disk drive (HDD). The auxiliary storage unit 103 may include a removable medium, in other words, a portable recording medium. Examples of the removable medium include an USB (Universal Serial Bus) memory, and disc recording media, such as a CD (Compact Disc) and a DVD (Digital Versatile Disc). What is stored in the auxiliary storage unit 103 includes various programs, various data, and various tables, which can be written into and read out from the auxiliary storage unit 103 when necessary. The auxiliary storage unit 103 may also store an operating system (OS). All or a portion of the aforementioned information or data stored in the auxiliary storage unit 103 may be stored in the main storage unit 102 instead. Likewise, information or data stored in the main storage unit 102 may be stored in the auxiliary storage unit 103 instead.

The output unit 104 is a device that outputs a warning or the like to the occupant of the vehicle 10. The output unit 104 typically includes an audio output device, such as a speaker and/or a display device.

The location determination unit 105 is a device capable of determining the present location of the vehicle 10. The location determination unit 105 typically includes a GPS receiver.

The sensor unit 106 is a group of sensors capable of sensing the state of running of the vehicle 10 etc. Examples of the sensors in the sensor unit include, a vehicle speed sensor, a steering angle sensor, an acceleration sensor, a brake sensor, an accelerator position sensor, a radar sensor, a camera for capturing images of the surroundings of the vehicle, and a range sensor.

The communication unit 107 is, for example, a wireless communication circuit capable of performing data communication with other vehicles (V2V) by wireless communications. The wireless communication circuit performs vehicle-to-vehicle communication utilizing mobile communications, such as 5G (5th generation) mobile communications or LTE (Long Term Evolution) mobile communications. Alternatively, the wireless communication circuit may perform vehicle-to-vehicle communication using narrowband communications, such as DSRC (Dedicated Short Range Communications). Still alternatively, the wireless communication circuit may perform vehicle-to-vehicle communication using wireless communications, such as Wi-Fi, or short distance communications, such as BLE (Bluetooth Low Energy).

Various processes executed by the on-vehicle apparatus 100 configured as above may be executed by either hardware or software.

Functional Configuration of On-Vehicle Apparatus

In the following, the functional configuration of the on-vehicle apparatus will be described with reference to FIG. 3. As illustrated in FIG. 3, the on-vehicle apparatus 100 includes, as functional components, a transmission processing part F101 and a reception processing part F102. The transmission processing part F101 performs the processing of transmitting record information of the vehicle to other vehicles. The reception processing part F102 performs driving assistance, after receiving record information of other vehicles.

The transmission processing part F101 according to this embodiment includes a trajectory record obtaining part F1011, an abnormal behavior detection part F1012, an event information generation part F1013, a vehicle stoppage determination part F1014, and a record information generation part F1015. The functional modules included in the transmission processing part F101 are effective when the vehicle 10 acts as the first vehicle 10A in FIG. 1.

The trajectory record obtaining part F1011 obtains a record of the trajectory along which the vehicle 10 has travelled (i.e. trajectory record). For example, the trajectory record obtaining part F1011 stores location information obtained by the location determination part 105 on a time-series basis to obtain the trajectory record along which the vehicle 10 has travelled to its present location. The trajectory record obtained by the trajectory record obtaining part F1011 is stored in the main storage unit 102 or the auxiliary storage unit 103.

The abnormal behavior detection part F1012 detects abnormal behaviors of the vehicle 10. As described before, the abnormal behaviors include, but are not limited to, abrupt steering, abrupt deceleration, skid, and operation of an airbag. Abrupt steering is detected as excess of the steering speed or the steering acceleration that is calculated using the steering angle sensor in the sensor unit 106 over a specific speed or a specific acceleration. Abrupt deceleration is detected as excess of the deceleration that is calculated using the vehicle speed sensor in the sensor unit 106 over a specific deceleration. Skid is detected as excess of the slip ratio that is calculated using the vehicle speed sensor and the wheel speed sensor in the sensor unit 106 over a specific slip ratio. Operation of an airbag is detected by detecting an operation signal of the airbag (e.g. an activation signal of an inflator). When an abnormal behavior of the vehicle 10 is detected by the abnormal behavior detection part F1012, information about the abnormal behavior (which will also be referred to as "abnormality detection information" hereinafter) is sent from the abnormal behavior detection part F1012 to the event information generation part F1013 and the vehicle stoppage determination part F1014. The abnormality detection information contains, for example, information about the location of abnormality detection, the time at which the abnormal behavior is detected (which will also be referred to as "time of abnormality detection" hereinafter), and information about details of the abnormal behavior (e.g. the type of the abnormal behavior such as abrupt steering, abrupt deceleration, skid, or operation of an airbag). As the information about the location of abnormality detection, the location information acquired by the location determination part 105 at the time when the abnormal behavior is detected may be used.

The event information generation part F1013 generates event information on the basis of the abnormality detection information sent from the abnormal behavior detection part F1012. The event information in this embodiment is information in which the location of abnormality detection and details of the abnormal behavior are linked with each other. The event information generated by the event information generation part F1013 is transmitted to other vehicles through the communication unit 107.

The vehicle stoppage determination part F1014 determines or detects the stoppage of the vehicle 10. This determination process is triggered by the reception of abnormality detection information from the abnormal behavior detection part F1012. The vehicle stoppage determination part F1014 in this embodiment determines whether the vehicle 10 stops running within a specific length of time from the time of abnormality detection. The specific length of time is a time expected to be taken for a vehicle that becomes unable to run due to the abnormal behavior to stop. This specific length of time may be set, for example, as a length of several seconds to several tens seconds. It is determined that the vehicle 10 stops running when the vehicle speed measured by the vehicle speed sensor in the sensor unit 106 becomes zero. Alternatively, it may be determined that the vehicle 10 stops running when the wheel speed measured by the wheel speed sensor in the sensor unit 106 becomes zero. If it is determined that the vehicle 10 stops running within the specific length of time from the time of abnormality detection, the vehicle stoppage determination part F1014 sends information indicating that the vehicle 10 has stopped running and information about the location of the stopped vehicle 10 to the record information generation part 1015. As the information about the location of the stopped vehicle 10, the location information acquired by the location determination unit 105 at the time when it is determined that the vehicle 10 stops running may be used.

The record information generation part F1015 generates record information on the basis of the trajectory record obtained by the trajectory record obtaining part F1011. When no abnormal behavior of the vehicle 10 is detected, or when it is not determined that the vehicle 10 has stopped running after the detection of an abnormal behavior even if an abnormal behavior of the vehicle 10 is detected, the record information generation part F1015 generates record information in a normal way. Specifically, the record information generation part F1015 firstly generates an approximation trajectory in the form of a polygonal line that approximates the trajectory record obtained by the trajectory record obtaining part F1011. Then, the record information generation part F1015 extracts the corner points of the approximation trajectory. The corner points extracted are the first to (N-1)th nearest corner points to the present location of the vehicle 10, where N is the aforementioned upper limit. Then, the record information generation part F1015 generates record information containing information specifying the respective locations of the extracted corner points and information specifying the present location of the vehicle 10. The record information thus generated is information that specifies the latest trajectory record (or a set of N corner points including the present location of the vehicle 10 as a corner point) among the trajectory records whose end point is the present location of the vehicle 10.

When an abnormal behavior of the vehicle 10 occurs, in particular, when an abnormal behavior that makes the vehicle unable to run occurs, there is a possibility that the vehicle 10 changes its direction abruptly or run erratically in the period around the occurrence of the abnormal behavior. For this reason, when the trajectory record of the vehicle 10 after the occurrence of an abnormal behavior is approximated by a polygonal line, there is a possibility that the number of the corner points thereof becomes unduly large. In consequence, if the record information is generated in the normal way as described above, there is a possibility that the length (along the direction of travel of the road) of the trajectory represented by the record information becomes unduly short, as illustrated in FIG. 4. This can result in a relatively large distance between the start point of the trajectory record represented by the record information of the vehicle 10 (i.e. the first vehicle 10A in FIG. 4) and the present location of another vehicle behind it (i.e. the second vehicle 10B in FIG. 4). In consequence, there is a possibility that it is difficult to provide appropriate driving assistance in the second vehicle 10B.

According to this embodiment, if an abnormal behavior of the vehicle 10 is detected, and it is determined that the vehicle 10 stops running within the predetermined length of time from the time of detection of the abnormality, the record information generation part F1015 generates record information on the basis of a trajectory record prior to the detection of the abnormal behavior. In other words, the record information generation part F1015 generates record information on the basis of a trajectory record from which the trajectory record between the location of abnormality detection and the present location (of the stopped vehicle) is excluded. More specifically, the record information generation part F1015 generates an approximation trajectory using a trajectory record prior to the detection of the abnormal behavior (i.e. a trajectory record preceding the location of abnormality detection) among the trajectory records obtained by the trajectory record obtaining part F1011. Then, the record information generation part F1015 extracts the latest corner points from the approximation trajectory generated as above. The corner points extracted are the first to (N-2)th nearest corner points to the location of abnormality detection. Then, the record information generation part F1015 generates record information on the basis of the (N-2) corner points extracted as above with the addition of the location of abnormality detection and the present location of the stopped vehicle 10. The recorded information generated in this way represents a relatively long trajectory record. For example, in the case illustrated in FIG. 1, the record information contains the corner points represented by the hollow circles but does not contain the corner points represented by the solid circles. In consequence, the distance between the present location of the second vehicle 10B and the start point of the trajectory record represented by this record information is small.

The record information generated by the record information generation part F1015 is transmitted to other vehicles through the communication unit 107.

The reception processing part F102 in this embodiment includes a lane sameness determination part F1021, a nearness determination part F1022, and a warning generation part F1023. The functional modules included in the reception processing part F102 are effective when the vehicle 10 acts as the second vehicle 10B in FIG. 1.

When recorded information transmitted from another vehicle running ahead of the vehicle 10 is received, the lane sameness determination part F1021 determines whether the vehicle 10 is running in the same lane as the other vehicle. For example, if the distance between the trajectory along which the other vehicle has travelled and the trajectory along which the vehicle 10 is travelling is smaller than a specific distance, the lane sameness determination part F1021 determines that the vehicle 10 is running in the same lane as the other vehicle. The method of determining whether the vehicle 10 is running in the same lane as the other vehicle is not limited to the above method, but other known methods may be employed.

The nearness determination part F1022 determines whether the vehicle 10 comes near the other vehicle, in the case where it is determined that the vehicle 10 is running in the same lane as the other vehicle. For example, if the distance between the vehicle 10 and the other vehicle is smaller than a specific threshold, the nearness determination part F1022 determines that the vehicle 10 comes near the other vehicle. In this process, the distance between the vehicle 10 and the other vehicle is calculated on the basis of the present location of the vehicle 10 and the present location of the other vehicle. Alternatively, the distance between the vehicle 10 and the other vehicle may be measured by the range sensor in the sensor unit 106. Alternatively, the nearness determination part F1022 may determine that the vehicle 10 comes near the other vehicle, if the time expected to be taken for the vehicle 10 to reach the location at which the other vehicle is located is smaller than a specific threshold. This expected time will also be referred to as "expected time of reaching". The expected time of reaching may be calculated from the distance and the relative speed between the vehicle 10 and the other vehicle. The method of determining the nearness of the vehicle 10 and the other vehicle is not limited to the above method, but other known methods may be employed.

The warming generation part F1023 generates warning for assisting driving by the occupant. If it is determined by the nearness determination part F1022 that the vehicle 10 comes near the other vehicle, the warning generation part F1023 according to this embodiment generates a first warning. The first warning contains information for informing the occupant that the vehicle 10 comes near the other vehicle and/or information for prompting the occupant to decelerate the vehicle 10. The first warning may include either audio information only or a combination of audio information and text information.

When the on-vehicle apparatus 100 receives event information from the other vehicle, the warning generation part F1023 generates a second warning. The second warning contains information for informing the occupant of the vehicle 10 of the location of abnormality detection of the other vehicle and details of the abnormal behavior of the other vehicle. The second warning may include either audio information only or a combination of audio information and text information.

The first warning and the second warning generated by the warning generation part F1023 are output through the output unit 104.

Processes Performed by Driver Assistance System

Processes performed by the driver assistance system according to the embodiment will be described with reference to FIGS. 5 and 6. FIG. 5 is a flow chart of a process executed by the on-vehicle apparatus 100 to transmit record information of the vehicle 10 to other vehicles. FIG. 6 is a flow chart of a process executed by the on-vehicle apparatus 100 when it receives record information of another vehicle. In the following description, it is assumed that the first on-vehicle apparatus 100A in FIG. 1 executes the process according to the flow chart of FIG. 5, and the second on-vehicle apparatus 100B in FIG. 1 executes the process according to the flow chart of FIG. 6.

In the process according to the flow chart of FIG. 5, the trajectory record obtaining part F1011 of the first on-vehicle apparatus 100A obtains a trajectory record of the first vehicle 10A (step S101). Then, the abnormal behavior detection part F1012 of the first on-vehicle apparatus 100A determines whether an abnormal behavior of the first vehicle 10A is detected (step S102). For example, the abnormal behavior detection part F1012 determines that an abnormal behavior of the vehicle 10A is detected, if at least one of the following conditions (1) to (4) is met:

(1) the steering speed or the steering acceleration is higher than a specific speed or a specific acceleration (2) the magnitude of deceleration is higher than a specific magnitude (3) the slip ratio is higher than a specific slip ratio (4) an airbag operates If none of the above conditions (1) to (4) is met (a negative answer in step S102), the record information generation part F1015 of the first on-vehicle apparatus 100A generates record information in the normal way (step S107). Specifically, the record information generation part F1015 firstly generates an approximation trajectory on the basis of a trajectory record obtained by the trajectory record obtaining part F1011. Then, the record information generation part F1015 extracts the first to (N-1)th nearest corner points to the present location of the first vehicle 10A from the approximate trajectory. Then, the record information generation part F1015 generates record information based on the respective locations of the extracted (N-1) corner points and the present location of the first vehicle 10A. In other word, the record information generation part F1015 generates record information by arranging information specifying the respective locations of the corner points and information specifying the present location of the first vehicle 10A on a time-series basis. The record information thus generated is transmitted to other vehicles through the communication unit 107 (step S108).

If at least one of the above conditions (1) to (4) is met (an affirmative answer in step S102), the abnormal behavior detection part F1012 sends abnormality detection information to the event information generation part F1013 and the vehicle stoppage determination part F1014. Triggered by the reception of the abnormality detection information, the event information generation part F1013 generates event information (step S103). Specifically, the event information generation part F1013 generates event information by linking the location of abnormality detection and details of the abnormal behavior with each other. The event information generated by the event information generation part F1013 is transmitted to other vehicles through the communication unit 107 (step S104).

After receiving the abnormality detection information from the abnormal behavior detection part F1012, the vehicle stoppage determination part F1014 determines whether the first vehicle 10A stopped running within a specific length of time from the time of abnormality detection (step S105). Specifically, the vehicle stoppage determination part F1014 determines whether the vehicle speed measured by the vehicle speed sensor in the sensor unit 106 became zero within the specific length of time from the time of abnormality detection. Alternatively, the vehicle stoppage determination part F1014 may determine whether the wheel speed measured by the wheel speed sensor in the sensor unit 106 became zero within the specific length of time from the time of abnormality detection. If it is determined that the first vehicle 10A did not stop running within the specific length of time from the time of abnormality detection by the above method (a negative answer in step S105), it is assumed that the abnormal behavior of the first vehicle 10A was temporary. Therefore, if a negative determination is made in step S105, the record information is generated in the normal way. In consequence, if step S105 is answered in the negative, the processing of step S107 and the processing of S108 are executed sequentially.

If it is determined that the first vehicle 10A stopped running within the specific length of time from the time of abnormality detection (an affirmative answer in step S105), there is a possibility that the first vehicle 10A is so damaged that it is unable to run. In such cases, it is probable that the first vehicle 10A changed its direction abruptly or run erratically in the period around the time of abnormality detection. Therefore, if step S105 is answered in the affirmative, the record information is generated in a way different from the normal way. Specifically, the record information generation part F1015 generates record information on the basis of a trajectory record from which the trajectory record from the location of abnormality detection to the present location (of the stopped first vehicle 10A) is excluded (step S106). In other words, the record information generation part F1015 generates record information on the basis of a trajectory record prior to the detection of the abnormal behavior. In this process, the record information generation part F1015 generates an approximation trajectory using a trajectory record prior to the detection of the abnormal behavior among the trajectory records obtained by the trajectory record obtaining part F1011. Then, the record information generation part F1015 extracts the first to (N-2) th nearest corner points to the location of abnormality detection from the approximation trajectory. Then, the record information generation part F1015 generates record information by arranging information specifying the respective locations of the extracted (N-2) corner points, information specifying the location of abnormality detection, and information specifying the present location of the stopped vehicle 10 on a time-series basis. The trajectory record represented by the recorded information generated in this way tends to be longer than the trajectory record represented by record information generated in the normal way. Moreover, the trajectory record represented by the recorded information generated in this way tends to be nearer to vehicles running behind (e.g. the second vehicle 10B) than the trajectory record represented by record information generated in the normal way. Consequently, the distance between the start point of the trajectory record represented by the record information generated in this way and the present locations of vehicles running behind can be made smaller. The record information generated in step S106 is transmitted to other vehicles through the communication unit 107 (step S108).

Referring next to the flow chart of FIG. 6, the communication unit 107 of the second on-vehicle apparatus 100B receives the record information transmitted from the first vehicle 10A (step S201). Then, the lane sameness determination part F1021 of the reception processing part F102 determines whether the second vehicle 10B is running in the same lane as the first vehicle 10A (step S202). For example, the lane sameness determination part F1021 determines whether the distance between the trajectory along which the first vehicle 10A has travelled and the trajectory along which the second vehicle 10B is travelling is smaller than a specific distance. Even in the case where the first vehicle 10A stopped running soon after the occurrence of the abnormal behavior, the above determination can be made with improved accuracy, because the distance between the start point of the trajectory record represented by the record information transmitted from the first vehicle 10A and the present location of the second vehicle 10B is small. If it is determined that the second vehicle 10B is not running in the same lane as the first vehicle 10A (a negative answer in step S202), the process according to the flow chart of FIG. 6 is ended. On the other hand, if it is determined that the second vehicle 10B is running in the same lane as the first vehicle 10A (an affirmative answer in step S202), the nearness determination part F1022 of the reception processing part F102 determines whether the second vehicle 10B comes near the first vehicle 10A (step S203). In this process, if the distance between the present location of the second vehicle 10B and the present location of the first vehicle 10A is smaller than a specific threshold, it may be determined that the second vehicle 10B comes near the first vehicle 10A. Alternatively, if the expected time of reaching mentioned above is shorter than a specific threshold, it may be determined that the second vehicle 10B comes near the first vehicle 10A. If it is determined that the second vehicle 10B comes near the first vehicle 10A (an affirmative answer in step S203), the warning generation part F1023 of the second vehicle 10B outputs the first warning through the output unit 104 of the second vehicle 10B (step S206). Specifically, the warning generation part F1023 of the second vehicle 10B firstly generates the first warning. As described above, the first warning contains information for informing the occupant that the second vehicle 10B comes near the first vehicle 10A and information for prompting the occupant to decelerate the second vehicle 10B. Then, the warning generation part F1023 outputs the first warning generated as above through the output unit 104 of the second vehicle 10B. In the case where the first warning is audio information, the first warning is output by the speaker in the output unit 104. In the case where the first warning includes audio information and text information, the first warning is output by both the speaker and the display of the output unit 104. As the first warning is output in this way, the occupant of the second vehicle 10B can become aware that the second vehicle 10B comes near the first vehicle 10A with improved reliability. This enables the occupant of the second vehicle 10B to perform driving operation for preventing the second vehicle 10B from coming unduly close to the first vehicle 10 or colliding with the first vehicle 10A (e.g. operation for decelerating the second vehicle 10B).

If it is determined that the second vehicle 10B does not come near the first vehicle 10A (a negative answer in step S203), the warning generation part F1023 determines whether the second on-vehicle apparatus 100B has received event information from the first vehicle 10A (step S204). If the second on-vehicle apparatus 100B has not received event information from the first vehicle 10A (a negative answer in step S204), the process according to the flow chart of FIG. 6 is ended. On the other hand, if the second on-vehicle apparatus 100B has received event information from the first vehicle 10A (an affirmative answer in step S204), the warning generation part F1023 outputs the second warning through the output unit 104 of the second vehicle 10B (step S205). Specifically, the warning generation unit F1023 of the second vehicle 10B firstly generates the second warning. As described above, the second warning contains information for informing the occupant of the second vehicle 10B of the location of abnormality detection of the first vehicle 10A and details of the abnormal behavior of the first vehicle 10A. Then, the warning generation part F1023 outputs the second warning generated as above through the output unit 104 of the second vehicle 10B. In the case where the second warning is audio information, the second warning is output by the speaker in the output unit 104. In the case where the second warning includes audio information and text information, the second warning is output by both the speaker and the display in the output unit 104. The location of abnormality detection of the first vehicle 10A may be indicated by a marking on a map of a car navigation system provided on the second vehicle 10B. As the second warning is output in this way, the occupant of the second vehicle 10B can become aware of the location of abnormality detection of the first vehicle 10A and details of the abnormal behavior that occurred at the that location. This can invite the occupant of the second vehicle 10B to make efforts to drive safely when the second vehicle 10B runs through the location of abnormality detection.

As per the above process according to the flow charts of FIGS. 5 and 6, even when the first vehicle 10A stops running soon after the occurrence of an abnormal behavior, it can transmit more useful record information to the second vehicle 10B running behind. In consequence, the second vehicle 10B can provide appropriate driving assistance on the basis of the record information transmitted from the first vehicle 10A.

First Modification

In the above described embodiment, when an abnormal behavior of the first vehicle 10A is detected, and the first vehicle 10A does not stop running soon after the detection, record information is generated in the normal way. However, when an abnormal behavior of the first vehicle 10A is detected, record information may be generated on the basis of a trajectory record prior to the detection of the abnormal behavior, even if the first vehicle 10A does not stop running soon after the detection. In other words, when an abnormal behavior of the first vehicle 10A is detected, record information may be generated on the basis of a trajectory record prior to the detection of the abnormal behavior irrespective of whether the first vehicle 10A stops running soon after the detection or not. Specifically, the processing of step S105 in the process according to the flow chart of FIG. 5 may be eliminated.

With this modification, for example, even if the first vehicle 10A changes its direction abruptly several times to avoid danger, the first vehicle 10A can transmit more useful information to other vehicles running behind with improved reliability.

Second Modification

In the case where record information is generated on the basis of a trajectory record prior to the detection of an abnormal behavior of the first vehicle 10A, information for specifying the location of abnormality detection may be contained in the record information. In the case where the record information is generated on the basis of a trajectory record prior to the detection of the abnormal behavior of the first vehicle 10A, it is impossible for the second vehicle 10B to recognize the trajectory record of the first vehicle 10A from the location of abnormality detection to the present location of the first vehicle 10A (at which it is stopped).

If the record information contains information for specifying the location of abnormality detection (which will also be referred to as "specifying information" hereinafter), the process of disabling driving assistance based on the record information of the first vehicle 10A may be performed in the section from the location of abnormality detection to the location at which the first vehicle 10A is stopped. In this connection, when the second vehicle 10B comes near the location of abnormality detection, a warning may be output in the second vehicle 10B to inform the occupant that the second vehicle 10B comes near the location of abnormality detection.

A process that is executed by the second on-vehicle apparatus 100B when it receives record information from the first vehicle 10A according to this modification will be described with reference to FIG. 7. In FIG. 7, the processing steps same as those in FIG. 6 are denoted by the same signs and will not be described further.

In the process according to the flow chart of FIG. 7, if step S204 is answered in the affirmative, the processing of step S2001 is executed. In step S2001, the nearness determination part F1022 determines whether the second vehicle 10B has come near the location of abnormality detection. Specifically, the nearness determination part F1022 firstly extracts the location of abnormality detection from the corner points included in the record information, based on the specifying information. Then, the nearness determination part F1022 determines whether the second vehicle 10B has entered a first range from the location of abnormality detection. The first range is such a range that the second vehicle 10B located in this range is considered to be able to actually stop before reaching the location of abnormality detection, when the second vehicle 10B needs to stop before reaching the location of abnormal detection. If the second vehicle 10B has entered the first range from the location of abnormality detection, it is determined that the second vehicle 10B has come near the location of abnormality detection (an affirmative answer in step S2001). On the other hand, if the second vehicle 10B has not entered the first range from the location of abnormality detection, it is determined that the second vehicle 10B has not come near the location of abnormality detection (a negative answer in step S2001).

If the step S2001 is answered in the negative, the processing of step S205 is executed next. On the other hand, if the step S2001 is answered in the affirmative, the processing of step S2002 is executed next. In step S2002, the warning generation part F1023 of the second vehicle 10B generates a warning (third warning) for informing the occupant of the nearness of the location of abnormality detection. The third warning contains, for example, information for prompting the occupant of the second vehicle 10B to check the safety, decelerate the second vehicle 10B, or temporarily stop the second vehicle 10B. The third warning may further contain information informing the occupant of the second vehicle 10B of details of the abnormal behavior of the first vehicle 10A. Then, the warning generation part F1023 of the second vehicle 10B outputs the third warning generated as above through the output unit 104 of the second vehicle 10B.

When the second vehicle 10B comes near the location of abnormal behavior, the arrangement according to this modification enables the occupant of the second vehicle 10B to check the safety, decelerate the second vehicle 10B, or temporarily stop the second vehicle 10B. If information about details of the abnormal behavior is contained in the third warning, it is possible to give warning adapted to the nature of the abnormal behavior to the occupant of the second vehicle 10B. For example, in the case where the abnormal behavior is a skid of the first vehicle 10A, it is possible to make the occupant cautious about the possibly slippery road surface at the location of abnormality detection. In the case where the abnormal behavior is operation of an airbag of the first vehicle 10A, it is possible to make the occupant cautious about parts of the first vehicle 10A that may possibly be scattered around the location of abnormality detection.

Third Modification

In the case where record information is generated on the basis of a trajectory record prior to the detection of an abnormal behavior of the first vehicle 10A, information for specifying the location of stoppage of the first vehicle 10A may be contained in the record information. In other words, the record information may contain information specifying that the present location of the first vehicle 10A is the location at which the first vehicle 10A is stopped. This information will also be referred to as "stop location information" hereinafter. In this connection, when the second vehicle 10B comes near the location at which the first vehicle 10A is stopped, the second vehicle 10B may output an alert indicating the nearness of that location. For example, in the case where the aforementioned stop location information is contained in the record information, the nearness determination part F1022 may execute the following processing in place of the processing of step S203 in the processes according to the flow charts of FIGS. 6 and 7. Specifically, the nearness determination part F1022 may determine whether the second vehicle 10B has entered a second range from the location at which the first vehicle 10A is stopped. The second range is such a range that the second vehicle 10B located in this range is considered to be able to actually stop before reaching the location at which the first vehicle 10A is stopped, when the second vehicle 10B needs to stop before reaching that location. If the second vehicle 10B has entered the second range from the location at which the first vehicle 10A is stopped, it is determined that the second vehicle 10B has come near that location. On the other hand, if the second vehicle 10B has not entered the second range from the location at which the first vehicle 10A is stopped, it is determined that the second vehicle 10B has not come near that location. If it is determined that the second vehicle 10B comes near the location at which the first vehicle 10A is stopped, the warning generation part F1023 may include additional information in the first warning, in step S206 of the processes according to the flow charts of FIGS. 6 and 7. Specifically, the warning generation part F1023 may include in the first warning information for informing the occupant of the second vehicle 10B that the first vehicle 10A stopped running soon after the occurrence of the abnormal behavior. This enables the occupant of the second vehicle 10B to perform driving operations for avoiding a collision of the second vehicle 10B with the first vehicle 10A and to know that the first vehicle 10A is so damaged that it is unable to run.

Others

The above embodiment and modifications have been described only by way of example. Modifications can be made to them without departing from the essence of this disclosure. For example, some features of the above-described embodiment and modifications may be employed in any possible combination.

The processing and means that have been described in the foregoing may be employed in any combination so long as it is technically feasible to do so. One, some, or all of the processes that have been described as processes performed by one apparatus may be performed by a plurality of apparatuses in a distributed manner. One, some, or all of the processes that have been described as processes performed by different apparatuses may be performed by a single apparatus. The hardware configuration employed to implement various functions in a computer system may be modified flexibly.

The technology disclosed herein can be carried out by supplying a computer program(s) that implements the functions described in the above description of the embodiment to a computer to cause one or more processors of the computer to read and execute the program(s). Such a computer program(s) may be supplied to the computer by a computer-readable, non-transitory storage medium that can be connected to a system bus of the computer, or through a network. The computer-readable, non-transitory storage medium refers to a recording medium that can store information, such as data and programs, electrically, magnetically, optically, mechanically, or chemically in such a way as to allow the computer or the like to read the stored information. Examples of such a recording medium include any type of disc medium including a magnetic disc, such as a floppy disc (registered trademark) and a hard disk drive (HDD) and an optical disc, such as a CD-ROM, a DVD and a Blu-ray disc. Examples of the recording medium further include other recording media, such as a read-only memory (ROM), a random access memory (RAM), an EPROM, an EEPROM, a magnetic card, a flash memory, an optical card, and a solid state drive (SSD).

While the present disclosure has been described with reference to exemplary embodiments, it is to be understood that the invention is not limited to the disclosed exemplary embodiments.

What is claimed is:

1. An information processing system comprising:

a first information processing apparatus that is provided on a first vehicle and transmits record information defined as information representing a record of the trajectory along which the first vehicle has travelled to other vehicles; and a second information processing apparatus that is provided on a second vehicle, forecasts whether there is a possibility that the second vehicle will collide with the first vehicle on the basis of the record information received from the first information processing apparatus, and gives a warning to an occupant of the second vehicle, if it is forecast that there is a possibility that the second vehicle will collide with the first vehicle, wherein when an abnormal behavior of the first vehicle is detected, the first information processing apparatus transmits information representing a record of the trajectory along which the first vehicle had travelled before the detection of the abnormal behavior of the first vehicle to the second vehicle as the record information, and wherein if the first vehicle stops running within a specific length of time from the detection of an abnormal behavior of the first vehicle, the first information processing apparatus transmits information about the location at which the first vehicle is stopped to other vehicles with the record information, and the second information processing apparatus informs the occupant of the second vehicle that the second vehicle comes near the location at which the first vehicle is stopped, when the second vehicle enters a second range from the location at which the first vehicle is stopped.

2. An information processing system according to claim 1, wherein the record information is information representing the latest record of the trajectory whose amount of data does not exceed a specific data amount among the records of the trajectory along which the first vehicle had travelled before the detection of the abnormal behavior of the first vehicle.

3. An information processing system according to claim 1, wherein the first information processing apparatus transmits information for specifying the location of abnormality detection defined as the location at which an abnormal behavior of the first vehicle is detected to other vehicles with the record information, and the second information processing apparatus informs the occupant of the second vehicle that the second vehicle comes near the location of abnormality detection, when the second vehicle enters a first range from the location of abnormality detection.

* * * * *